United States Patent

De Zwart et al.

[11] Patent Number: 5,966,109
[45] Date of Patent: Oct. 12, 1999

[54] PICTURE DISPLAY DEVICE HAVING A FLAT VACUUM TUBE

[75] Inventors: Siebe T. De Zwart; Nicolaas Lambert; Gerardus G. P. Van Gorkom; Petrus H. F. Trompenaars, all of Eindhoven, Netherlands

[73] Assignee: U.S. Philips Corporation, New York, N.Y.

[21] Appl. No.: 08/787,058

[22] Filed: Dec. 6, 1996

Related U.S. Application Data

[63] Continuation of application No. 08/342,935, Nov. 21, 1994, abandoned, which is a continuation-in-part of application No. 08/287,052, Aug. 8, 1994, Pat. No. 5,515,873, application No. 08/303,555, Nov. 8, 1994, Pat. No. 5,625,253, and application No. 08/335,218, Nov. 7, 1994, Pat. No. 5,497,046, which is a continuation of application No. 08/223,962, Jul. 17, 1992, abandoned, which is a continuation of application No. 07/715,072, Jun. 13, 1991, abandoned, said application No. 08/287,052, is a continuation of application No. 07/990,780, Dec. 9, 1992, abandoned, which is a continuation-in-part of application No. 07/830,951, Feb. 6, 1992, Pat. No. 5,313,136, which is a continuation of application No. 07/528,677, May 24, 1990, abandoned, and a continuation-in-part of application No. 08/053,980, Apr. 26, 1993, Pat. No. 5,347,199, which is a continuation of application No. 07/954,949, Sep. 30, 1992, abandoned, which is a continuation of application No. 07/637,039, Jan. 3, 1991, abandoned, which is a continuation-in-part of application No. 07/528,677, May 24, 1990, abandoned, said application No. 08/303,555, is a continuation of application No. 08/023,520, Feb. 26, 1993, abandoned, which is a continuation-in-part of application No. 08/223,962, Jul. 17, 1992, abandoned, application No. 07/830,951, Feb. 6, 1992, Pat. No. 5,313,136, and application No. 08/053,980, Apr. 26, 1993, Pat. No. 5,347,199, which is a continuation of application No. 07/954,949, Sep. 30, 1992, abandoned, which is a continuation of application No. 07/637,039, Jan. 3, 1991, abandoned, which is a continuation-in-part of application No. 07/528,677, May 24, 1990, abandoned, said application No. 08/223,962, is a continuation of application No. 07/715,072, Jun. 13, 1991, abandoned, said application No. 08/830,951, is a continuation of application No. 07/528,677, May 24, 1990, abandoned.

[51] Int. Cl.⁶ .................................................. G09G 3/22
[52] U.S. Cl. .............................. 345/75; 313/422; 313/495
[58] Field of Search .................................. 345/67, 74, 75, 345/76, 77, 78, 79, 80, 88, 103; 313/422, 495; 315/169.1, 169.3, 366, 167, 168

[56] References Cited

U.S. PATENT DOCUMENTS

| 4,694,225 | 9/1987 | Tomii et al. | 313/422 |
| 5,387,838 | 2/1995 | Hirakawa et al. | 345/75 |

FOREIGN PATENT DOCUMENTS

| 0464937 | 1/1992 | European Pat. Off. | H01J 31/12 |
| 0560434 | 9/1993 | European Pat. Off. | H01J 31/12 |

*Primary Examiner*—Regina Liang
*Attorney, Agent, or Firm*—Robert J. Kraus

[57] ABSTRACT

A picture display device having a flat vacuum envelope which is provided with a transparent face plate with a luminescent screen and with a rear wall, which display device has an electron supply section with an electron source for emitting electron currents in a direction parallel to the face plate, and an active selection electrode section with first, preselection, electrodes and second, fine-selection, electrodes, located closer to the screen, for directing each electron current towards desired pixels on the luminescent screen. The fine-selection electrodes are divided into groups and corresponding fine-selection electrodes of at least two groups are interconnected in a series or parallel arrangement in such a way that the technology of providing these electrodes is as simple as possible and/or the possible fine-selection electrode patterns are such that the number of required selection drivers can be reduced considerably.

23 Claims, 8 Drawing Sheets

PICTURE DISPLAY DEVICE HAVING A FLAT VACUUM TUBE

CROSS-REFERENCE TO RELATED APPLICATIONS

This is a continuation of application Ser. No. 08/342,935, filed Nov. 21, 1994 is now abandoned, which application is a continuation-in-part of:

U.S. patent application Ser. No. 08/287,052 filed on Aug. 8, 1994, now U.S. Pat. No. 5,575,873, which is a continuation of U.S. patent application Ser. No. 07/990,780 filed on Dec. 9, 1992, now abandoned which is:
- a continuation-in-part of U.S. patent application Ser. No. 07/830,951 filed on Feb. 6, 1992, now U.S. Pat. No. 5,313,136 which is a continuation of U.S. patent application Ser. No. 07/528,677 filed on May 24, 1990, now abandoned; and
- a continuation-in-part of U.S. patent application Ser. No. 08/053,980 filed on Apr. 26, 1993 now U.S. Pat. No. 5,347,199, which is a continuation of U.S. patent application Ser. No. 07/954,949 filed on Sep. 30, 1992, which is a continuation of U.S. patent application Ser. No. 07/637,039 filed on Jan. 3, 1991 now abandoned, which is a continuation-in-part of U.S. patent application Ser. No. 07/528,677 filed on May 24, 1990, now abandoned;

copending U.S. patent application Ser. No. 08/303,555 filed on Sep. 8, 1994 now U.S. Pat. No. 5,625,253, which is a continuation of U.S. patent application Ser. No. 08/023,520 filed on Feb. 26, 1993now abandoned, which is;
- a continuation-in-part of U.S. patent application Ser. No. 07/830,951 filed on Feb. 6, 1992 U.S. Pat. No. 5,313,136, which is a continuation of U.S. patent application Ser. No. 07/528,677 filed on May 24, 1990 now abandoned;
- a continuation-in-part of U.S. patent application Ser. No. 08/053,980 filed on Apr. 26, 1993 U.S. Pat. No. 5,347,199, which is a continuation of U.S. patent application Ser. No. 07/954,949 filed on Sep. 30, 1992 now abandoned, which is a continuation of U.S. patent application Ser. No. 07/637,039 filed on Jan. 3, 1991 now abandoned, which is a continuation-in-part of U.S. patent application Ser. No. 07/528,677 filed on May 24, 1990 now abandoned; and
- a continuation of U.S. patent application Ser. No. 08/223,962 filed on Jul. 17, 1992 now abandoned, which is a continuation of U.S. patent application Ser. No. 07/715,072 filed on Jun. 13, 1991 now abandoned;

U.S. patent application Ser. No. 08/335,218 filed on Nov. 7, 1994 U.S. Pat. No. 5,497,046, which is a continuation of U.S. patent application Ser. No. 08/223,962 filed on Jul. 17, 1992 now abandoned, which is a continuation of U.S. patent application Ser. No. 07/715,072 filed on Jun. 13, 1991 now abandoned.

BACKGROUND OF THE INVENTION

The invention relates to a picture display device having a flat vacuum envelope which is provided with a transparent face plate with a luminescent screen and with a rear wall, said display device comprising an electron supply section for emitting electron currents, and an active selection electrode section having first, preselection, electrodes and second, fine-selection, electrodes, located closer to the screen, for directing a plurality of electron currents towards desired positions on the luminescent screen.

The display device described above may be of the flat-panel type, as disclosed in EP-A-464 937, or of another flat-panel type in which electron currents parallel to a display screen are emitted and deflected towards predetermined positions on the display screen. Display devices of the flat-panel type are devices having a transparent face plate and, arranged at a small distance therefrom, a rear plate, in which the inner surface of the face plate is provided with a (for example, hexagonal) pattern of phosphor dots. If (video information-controlled) electrons impinge upon the luminescent screen, a visual image is formed which is visible via the front side of the face plate. The face plate may be flat or, if desired, curved (for example, spherical or cylindrical).

The display device disclosed in EP-A-464 937 comprises a plurality of juxtaposed sources for emitting electrons, local electron propagation means cooperating with the sources and each having walls of a high-ohmic, electrically substantially insulating material having a secondary emission coefficient suitable for propagating emitted electrons along the wall, and an addressing means comprising an active selection electrode section having (first) electrodes (preselection electrodes) which can be driven row by row so as to extract electrons from the propagation means at predetermined extraction locations facing the luminescent screen, further means being provided for directing extracted electrons towards pixels of the luminescent screen for producing a picture composed of pixels.

It is known from EP-A-464 937 to arrange an apertured fine-selection plate, whose apertures are addressable by means of second, or fine-selection electrodes between the first electrodes and the screen. The arrangement is such that each extraction location of the addressing means is associated with at least two apertures in the fine-selection plate. The selection electrode section is thus of the multi-stage (in this case two-stage) type. This means that the fine-selection electrodes can be divided into groups and that the corresponding fine-selection electrodes of two or more groups can be coupled to each other. In fact, a preselection has already taken place and electrons can no longer land on a wrong phosphor element arrangement (phosphor triplet). This means that the drive can be simplified because the number of drives can be reduced.

SUMMARY OF THE INVENTION

It is, inter alia an object of the invention to provide suitable coupling arrangements for the fine-selection electrodes of a picture display device of the type described hereinbefore.

To this end, an embodiment of a display device according to the invention is characterized in that the fine-selection electrodes comprise n groups of m electrodes each, and in that corresponding electrodes of at least 2 groups are coupled to each other in a series or parallel arrangement for supplying a selection voltage. This mode of arrangement may particularly be implemented in such a way that all fine-selection electrodes and their connections are coplanar.

The invention is particularly suitable for use in a picture display device in which electron currents are emitted in propagation ducts of dielectric material (referred to as insulating electron duct display).

To this end, an embodiment of a picture display device according to the invention is characterized in that the preselection electrodes of the display unit define extraction locations which communicate row by row with electron propagation ducts, and in that the fine-selection electrodes are arranged on a fine-selection plate provided with fine-selection apertures, each aperture being associated with a pixel on the luminescent screen and each extraction location being associated with at least two fine-selection apertures.

It is a further object of the invention to further reduce the number of drivers.

To this end, an embodiment of a picture display device according to the invention is characterized in that the number of drive voltages to be supplied by a fine-selection drive circuit corresponds to the number of fine-selection electrodes in a group in which each first fine-selection electrode of a group is coupled to each first fine-selection electrode of the other groups and in which, similarly, each subsequent (second, third, etc.) fine-selection electrode is coupled to each corresponding subsequent (second, third, etc.) fine-selection electrode of the other groups.

It is a further object of the invention to enhance the contrast of the displayed picture. To this end, a picture display device according to the invention is characterized in that an auxiliary (or dummy) electrode for capturing unwanted electrons is arranged between each extraction location and the associated fine-selection apertures.

It is a further object of the invention to reduce the number of drivers in the embodiment where auxiliary electrodes are used.

To this end, an embodiment of a picture display device according to the invention is characterized in that a plurality of groups of fine-selection electrodes jointly constitute a section and in that the fine-selection electrodes are distributed across a plurality of sections, each fine-selection electrode of a section being sequentially selected by means of a drive circuit, each first fine-selection electrode of a section being coupled to each first fine-selection electrode of the other sections and each subsequent fine-selection electrode of a section being coupled to the corresponding subsequent fine-selection electrode of the other sections, the dummy electrodes of one or more sections being coupled to each other and, in operation, being fed with the desired voltage(s) from a dummy drive circuit.

BRIEF DESCRIPTION OF THE DRAWINGS

These and other aspects of the invention will be apparent from and elucidated with reference to the embodiments described hereinafter.

In the drawing

DESCRIPTION OF THE PREFERRED EMBODIMENTS

Figure 1:
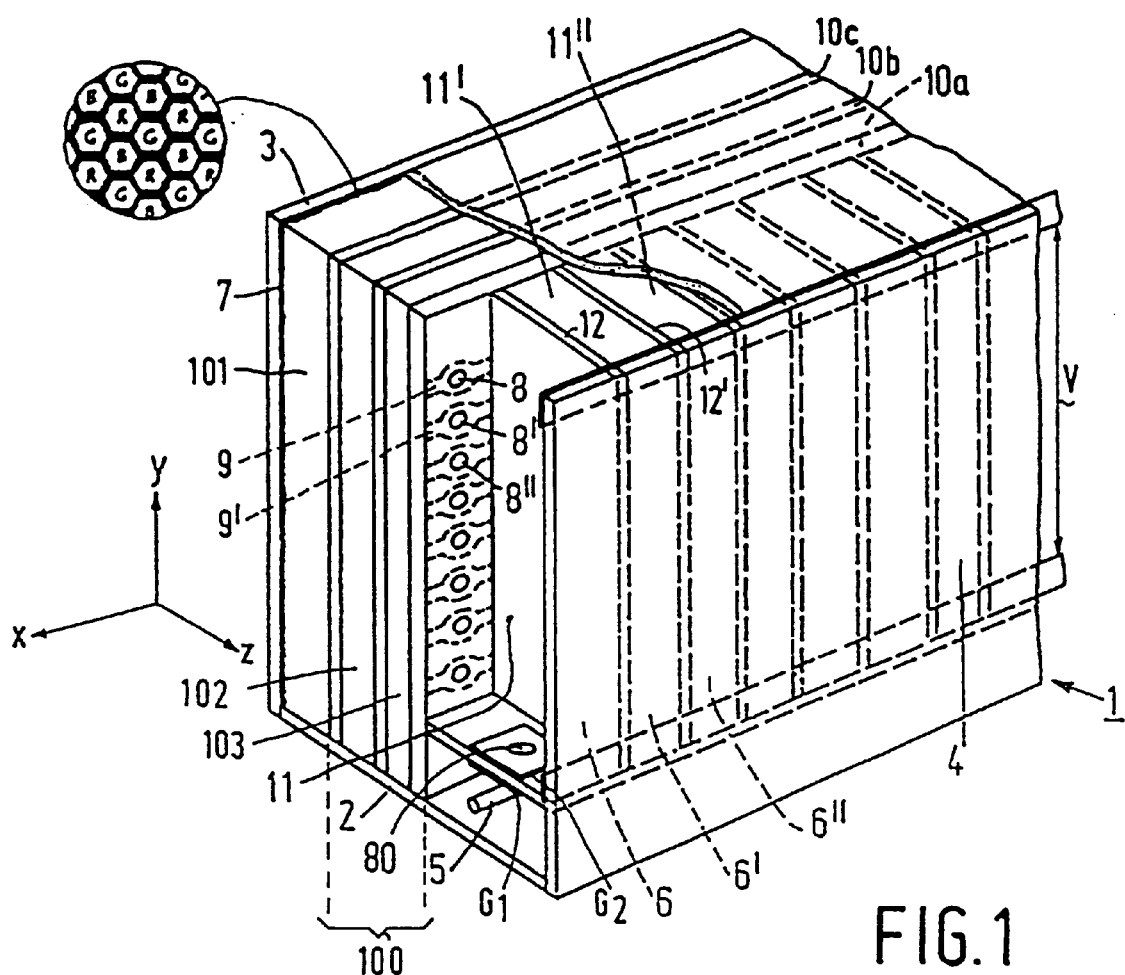
FIG. 1 is a diagrammatic perspective elevational view, partly broken away, of a display unit as can be used in a display device according to the invention.
Figure 2A:
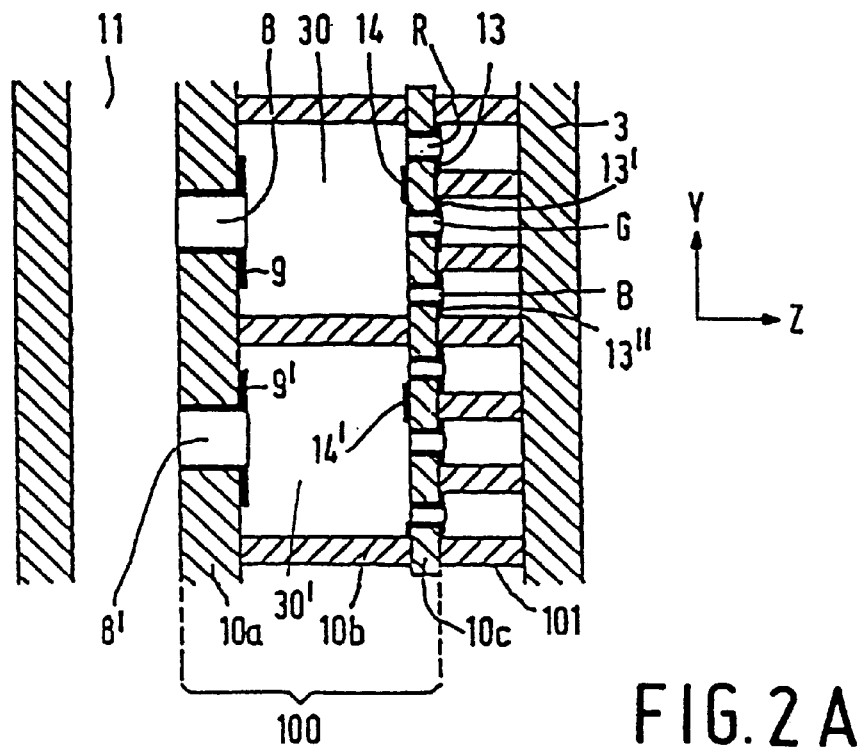
FIG. 2A is a cross-section through a display unit shown in FIG. 1.
Figure 2B:
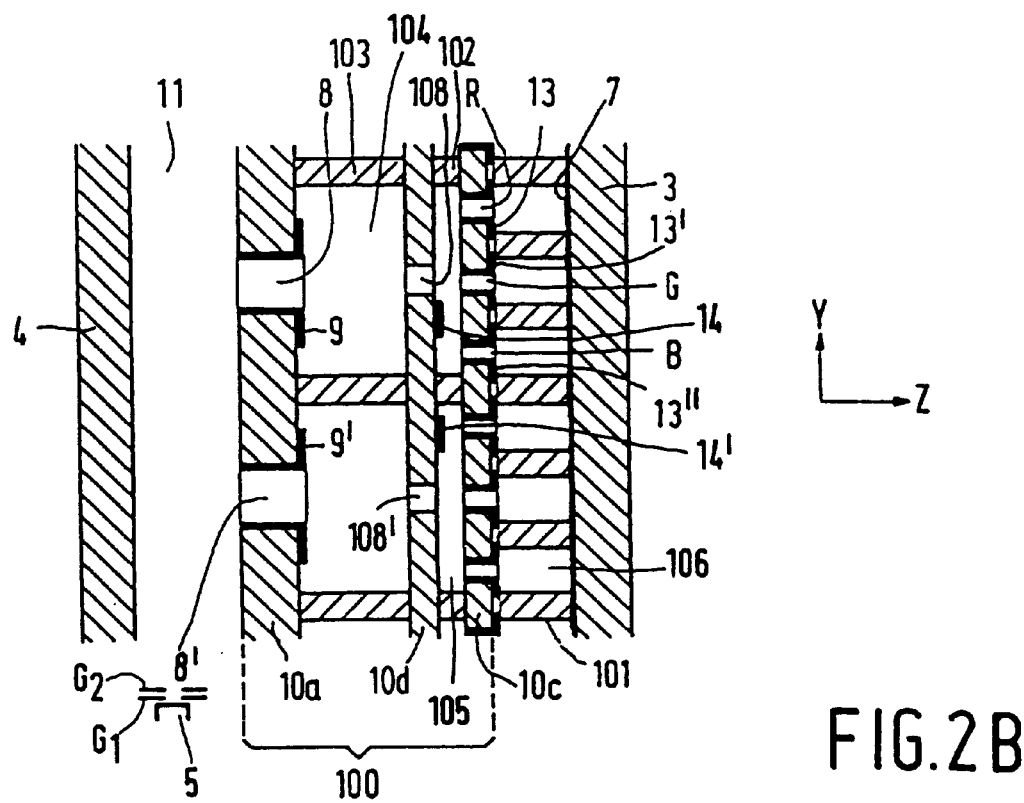
FIG. 2B is a cross-section through a modification of such a display unit.

FIGS. 1 and 2B show a flat-panel display unit 1 of a picture display device according to the invention having a display panel (window) 3 and a rear wall 4 located opposite said panel. A luminescent screen 7 having a repetitive pattern (rows or dots) of, for example triplets of red (R), green (G) and blue (B) luminescing phosphor elements is arranged on the inner surface of window 3. To be able to supply the required high voltage, the luminescent screen 7 is either arranged on a transparent, electrically conducting layer (for example, ITO), or provided with an electrically conducting layer (for example, A1 backing). In the embodiment shown (see inset) the (dot-shaped) phosphor elements of each triplet are arranged, for example in accordance with a delta arrangement rotated through 90°.

An electron source arrangement 5, for example a line cathode which by means of drive electrodes provides a large number of electron emitters (for example, 600) or a similar number of separate emitters, is arranged proximate to a connection plate 2 which interconnects display panel 3 and rear wall 4. Each of these emitters is to provide a relatively small current so that many types of cathodes (cold or hot cathodes) are suitable as emitters. The emitters may be arranged separately or, if combined to one line cathode, they may be arranged jointly. They may have a constant or controllable emission. The electron source arrangement 5 is arranged opposite entrance apertures of a row of electron propagation ducts extending substantially parallel to the screen, which ducts are constituted by compartments 6, 6', 6", . . . etc., in this case one compartment for each electron source. These compartments have cavities 11, 11',11", . . . defined by the rear wall 4 and partitions 12, 12', 12", . . . At least one wall (preferably the rear wall) of each compartment comprises a material which has a high electrical resistance which is suitable for the purpose of the invention in the longitudinal direction of the compartments (for example, ceramic material, glass, synthetic material— coated or uncoated-) and a secondary emission coefficient $\delta > 1$ over a given range of primary electron energies.

The electrical resistance of the wall material has such a value in the propagation or transport direction that a minimum possible total amount of current (preferably less than, for example 10 mA) will flow in the walls at a field strength in the axial direction in the compartments of the order of one hundred to several hundred Volts per cm required for the electron transport. In operation, a voltage V generating the field strength required for the transport is applied between an upper electrode 200 and a lower electrode 201 of the rear wall 4. By applying a voltage of the order of several dozen to several hundred volts (value of the voltage is dependent on circumstances) between row 5 of the electron sources and grids G1, G2 arranged at inputs of the compartments 6, 6", 6", . . . , electrons are accelerated from the electron sources towards the compartments, whereafter they impinge upon the walls in the compartments and generate secondary electrons. The electrons may be extracted from the compartments, for example row by row via extraction apertures 8, 8", . . . in a selection plate 10a, which apertures are energized by means of preselection electrodes 9, 9', . . . (see FIG. 2B), and accelerated by means of an acceleration voltage applied, in operation, between the selection plate and the luminescent screen 7. Further apertured electrically insulating plates for defining electron paths are arranged between the display panel 3 and the selection plate 10a. There are 5 plates in the embodiment shown in FIGS. 1 and 2B and 3 in the embodiment shown in FIG. 2A.

FIGS. 2A and 2B show the principle of multi-stage selection. Multi-stage selection is herein understood to mean that the selection from the compartments 6, 6', 6", . . . to the luminescent screen 7 is realised in at least two stages: a first (coarse) stage for selecting, for example pixels and a second (fine) stage for selecting, for example colour pixels. In the construction shown in a diagrammatic cross-section in FIG. 2A and 2B the space between the compartments and the luminescent screen 7, which is arranged on the inner wall of display panel 3, accommodates an active selection electrode system 100 which comprises an (active) preselection plate 10a, a spacer plate 10b and an (active) fine-selection plate 10c.

FIG. 2B shows in a diagrammatical cross-section a part of the display device of FIG. 1 in greater detail, particularly the addressing structure 100 comprising preselection plate 10a with apertures 8, 8', 8", . . . and fine-selection plate 10c with sets of apertures R, G, B. In this case, three fine-selection apertures R, G, B are associated with each preselection aperture 9, 9', etc. In the diagrammatic FIG. 2B the apertures R, G, B are in alignment. However, they are actually arranged in a configuration corresponding to the phosphor dot pattern (see FIG. 1). In contrast to the construction shown in FIG. 2A, an apertured obstruction plate 10a having apertures 108, 108", . . . is arranged between the preselection plate 10a and the fine-selection plate 10c, which obstruction plate prevents electrons from the transport or propagation ducts 11 directly impinging upon the display screen via a fine-selection aperture (referred to as unwanted "direct hits"). Communication ducts 104, 105 having a cross-section chosen to fit with the, for example triangular arrangements of phosphor elements to be driven are arranged in the spacer plates 102, 103. The (flu) spacer plate 101 located proximate to the phosphor pattern of the luminescent screen 7 has a very dense pattern of apertures 106 corresponding, in this case, to the phosphor pattern.

Electron propagation ducts 6 having transport holes 11, 11' are formed between the structure 100 and the rear wall 4. To be able to extract electrons from the ducts 6 via the apertures 8, 8', addressable metal preselection electrodes 9, 9', etc. extending from aperture to aperture and surrounding the apertures are arranged in ("horizontal") rows parallel to the long axis of the display screen at, for example the display screen side of plate 10a.

The walls of the apertures 8, 8', . . . may be metallized.

Similarly as plate 10a, the fine-selection plate 10c is provided with addressable rows of (fine-)selection electrodes for realising fine-selection via the apertures R, G, B. The possibility of directly or capacitively interconnecting corresponding rows of fine-selection electrodes is important in this respect. In fact, a preselection has already taken place and, in principle, electrons cannot land at the wrong location. This means that the minimum number of groups is normally equal to the number of fine-selection apertures required for each preselection aperture (3 in the relevant case), assuming that it should be possible to address each individual fine-selection aperture. In practice, there will and may be generally more than 3 groups and hence connections. A group represents all interconnected fine-selection electrodes, hence one connection. The drive is effected, for example as follows, but there are also other possibilities. The preselection electrodes are brought to a potential substantially linearly increasing with the distance to the electron source arrangement 5, for example by means of a suitable resistance ladder.

One or more picture lines are selected by applying a positive voltage pulse of, for example 250 V to the desired preselection electrodes used for selecting these picture lines. Colour pixels are addressed by applying pulses having an amplitude of, for example 200 V to the fine-selection electrodes. The fine-selection electrodes preferably have such an electrical resistance, or are connected to external resistors in such a way that they safeguard the electronic circuits (controlling the drive) against breakdown from the luminescent screen.

In a display device as described above, the number of drives may be limited if the selection of the electrons from the compartments 11, 11', . . . to the luminescent screen 7 is realised by means of a preselection (or "coarse" selection) and a "fine" selection.

Let it initially be assumed that the coarse selection (preselection) is driven per display line. A coarse selection element is either on or off. When a coarse selection element is on, the fine-selection block determines which screen pixel will be driven. Since always only one line of coarse selection elements is switched on simultaneously, assuming that one line cathode is used, the fine-selection blocks of different lines can be switched jointly.

The preselection may be realised in a single mode for each electron propagation duct or in a multiple mode (more apertures per "row") combined with the multiplexing mode. For example, each preselection electrode may be split up into two preselection sub-electrodes which cooperate with two preselection apertures in each duct. Using six fine-selection electrodes for two preselection apertures, this yields, for example two pixels with three colour pixels each. It will be evident that the choice of another mode of multiplexing (for example three preselection sub-electrodes) or another ratio between preselection electrodes and fine-selection electrodes will modify the numbers in the embodiments to be described hereinafter without changing the essence of the invention.

Figures 3A, 3B:
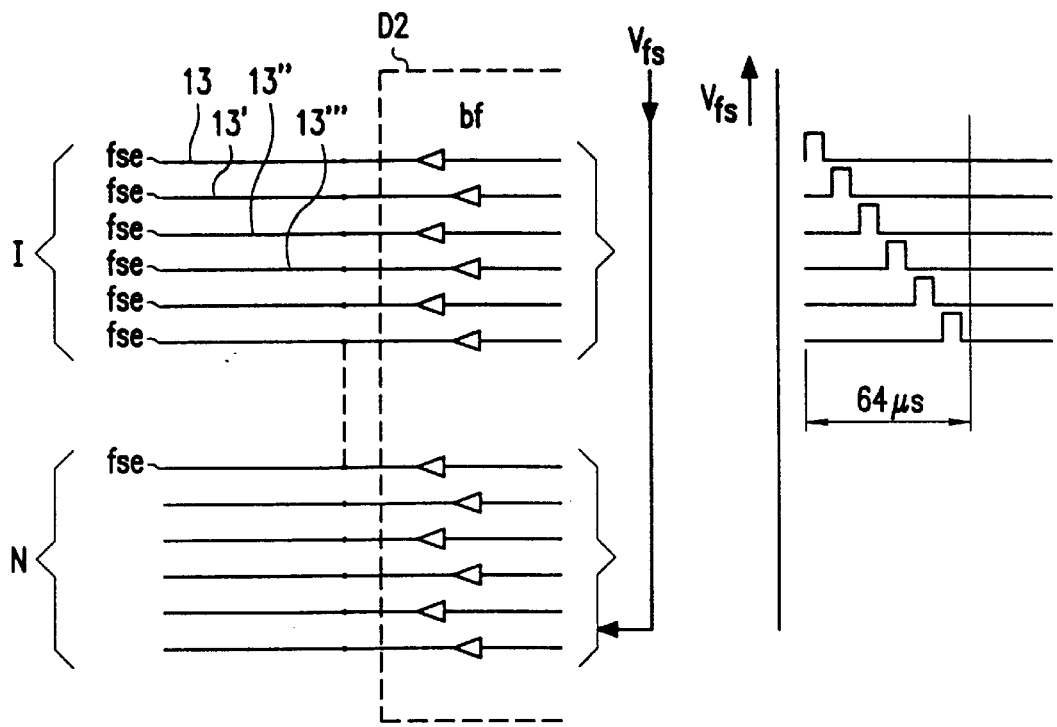
FIG. 3 shows diagrammatically two groups of fine-selection electrodes with a drive circuit.

FIG. 3A shows N groups of 6 fine-selection electrodes (fse) 13, 13', 13", . . . each being separately driven by means of buffers (bf) each receiving a given fine-selection voltage (Vfs). In this case, N is the number of preselection electrodes. These fine-selection voltages are generated by a drive circuit D2 under the control of a selection driver.

FIG. 3B shows the fine-selection voltages Vfs plotted with respect to time. Each fine-selection voltage consecutively needs a value, in this example for approximately 10 $\mu$sec, for selecting the relevant fine-selection apertures (for example, a voltage of 200 V). During the rest of the frame period, the non-selected fine-selection electrode convey the same voltage. In one line period (for example 60 $\mu$sec) six fine-selection electrodes should be consecutively selected in this example. This is diagrammatically shown in FIG. 3B by means of six voltages Vfs which consecutively represent a selection pulse (with respect to time).

Figures 4A, 4B:
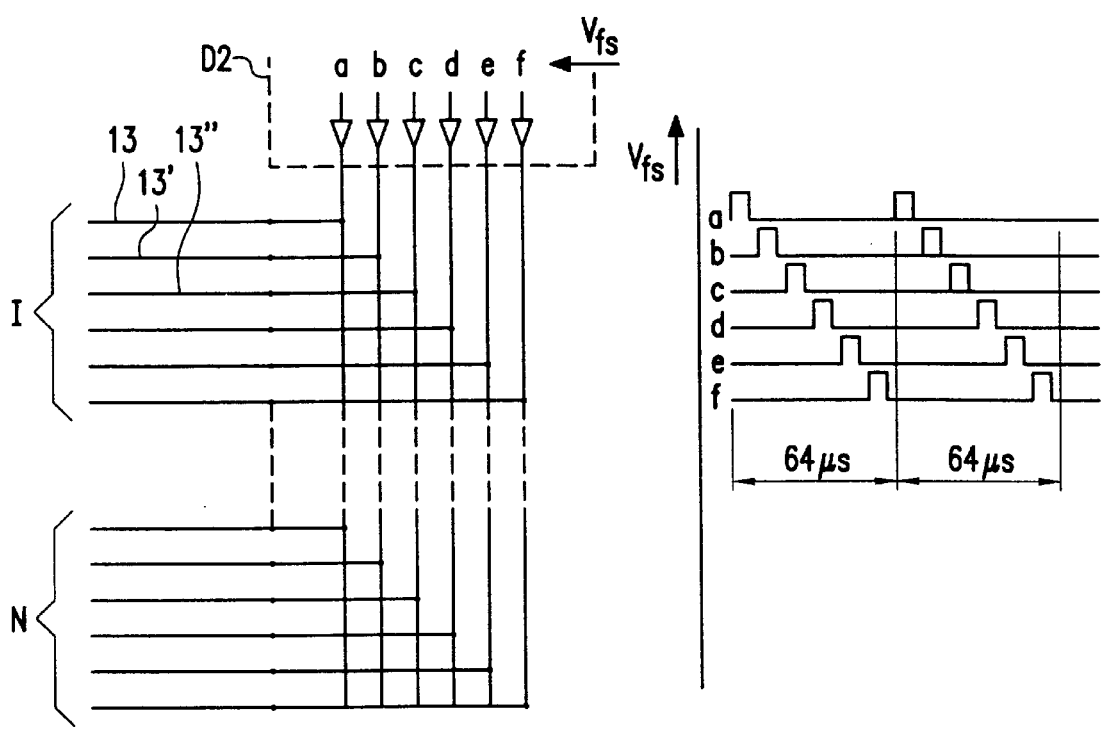
FIG. 4 shows an embodiment for reducing the number of drives of the fine-selection electrodes.

FIGS. 4A and 4B show embodiments in which the fine-selection electrodes 13, 13', 13", . . . are interconnected to corresponding fine-selection electrodes of subsequent groups. The number of drivers is reduced thereby, but this time each driver should supply N*N times more power. It is possible to interconnect these groups because the preselection electrodes determine whether the electrons reach the space accommodating the fine-selection electrodes. Now, the fine-selection drive circuit D2 should only supply six different fine-selection voltages Vfs (a, b, c, d, e, f) to the display unit (in this example). These are the six voltages for the first group of fine-selection electrodes (the first and the last group of fine-selection electrodes are shown).

The fine-selection voltages to be presented by the fine-selection drive circuit D2 should now be repetitive pulses having a repetition time of 64 $\mu$sec (in this example). Now, the respective voltages a, b, c, d, e and f should also be offset with respect to time and last approximately 10 $\mu$sec each.

The signals shown in FIGS. 3B and 4B are illustrative examples, but the signal sequence in practical displays is often more intricate. Particularly, three fine-selection apertures having separate electrodes may be associated with one coarse selection aperture. It may be advantageous to form the electrode pattern in such a way that each fine-selection electrode interconnects fine-selection apertures associated with three successive coarse selection apertures. If, for example both the coarse and the fine-selection electrodes are numbered 1, 2 etc. from top to bottom, fine-selection electrodes 1 2 3 are associated with 3 for coarse selection electrodes 1, 2 3 4 5, etc. A satisfactory selection sequence will then be, for example:

| coarse: | 1 | 1 | 1 | 2 | 2 | 2 | 3 | 3 |
|---------|---|---|---|---|---|---|---|---|
| fine:   | 1 | 2 | 3 | 2 | 3 | 4 | 3 | 5 |

The fine-selection thus "zigzags" a little. There are many other possibilities. For example, the fine-selection may be regular and the coarse selection may be zigzag; then the signal resembles that in FIGS. 3B and 4B but the period of time is typically 3 times longer because the coarse selection is meanwhile still switching. The above-mentioned example is based on a 3 to 1 selection system. For other selection systems (a different number of fine-selection apertures per coarse selection aperture, a different metal pattern or a different drive sequence) this is different again. Generally, the pulse sequence thus depends on the details of the apertures and the metallization pattern, and on the chosen dot selection sequence. The choice of the dot selection sequence is a compromise between (unwanted) charge effects, simplicity of the electronic circuits, switching power, etc. The video information on the column drivers of the display should also be suitable for the chosen selection sequence.

Figure 5:
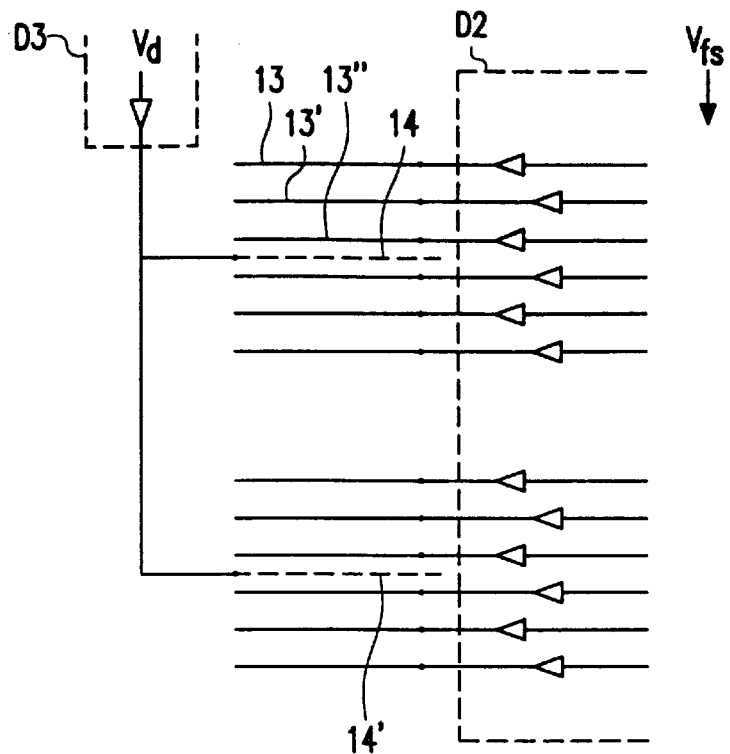
FIG. 5 shows an embodiment of fine-selection electrodes provided with auxiliary electrodes.

To enhance the contrast on the display screen, dummy electrodes 14, 14", 14"', . . . for capturing unwanted electrons in the ducts between the preselection and fine-selection can be used, as is shown in FIGS. 2A and 2B. Similarly as in FIG. 3, each fine-selection electrode is separately driven in FIG. 5 by means of drivers and fine-selection voltages Vfs, using the drive circuit D2. To enhance the contrast, one dummy electrode 14, 14', etc. is used for each selection block of six electrodes (shown in broken lines in FIG. 5). All dummy electrodes are interconnected and driven by means of one driver at a voltage Vd from a dummy electrode drive circuit D3.

In this example, the dummy electrodes 14, 14', 14", . . . continuously convey such a voltage that the voltage is higher than the voltage at the non-selected fine-selection electrodes and is also lower than the voltage at the selected fine-selection electrode.

Figure 6:
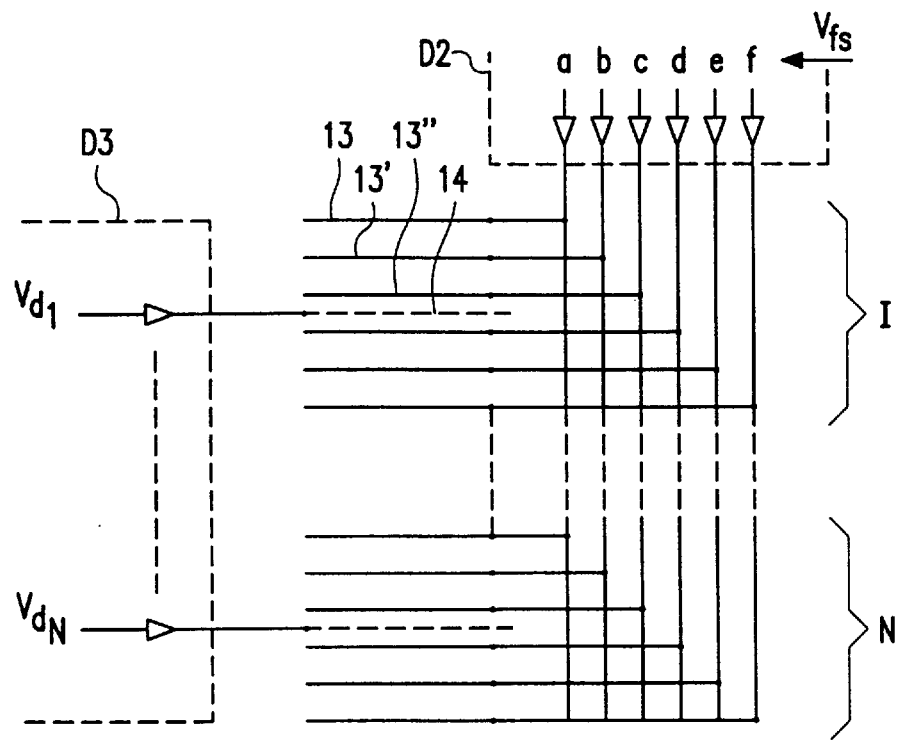
FIG. 6 shows an embodiment for reducing the number of drives of fine-selection electrodes provided with auxiliary electrodes.

In FIG. 6 in which, likewise as in FIG. 4, the fine-selection electrodes per group of six electrodes are interconnected, it is necessary to drive the dummy electrodes per group of six fine-selection electrodes separately from the dummy electrode drive circuit D3. The dummy electrodes 14, 14', 14", . . . are now driven by a voltage Vd1, . . . VdN, respectively, in which the voltage Vd has a value which is higher than that of the voltage at the selected fine-selection electrodes if the preselection electrode of a relevant fine-selection block should not pass electrons and has a lower value than that of the voltage at the selected fine-selection electrode but a higher value than that of the non-selected fine-selection electrodes if the preselection electrode of a relevant fine-selection block should pass electrons. It is thereby achieved that unwanted electrons are captured by the dummy electrodes while the dummy electrode does not have any influence when a relevant fine-selection block is "on". Consequently, 6+N drivers are necessary in this embodiment.

Figure 7:
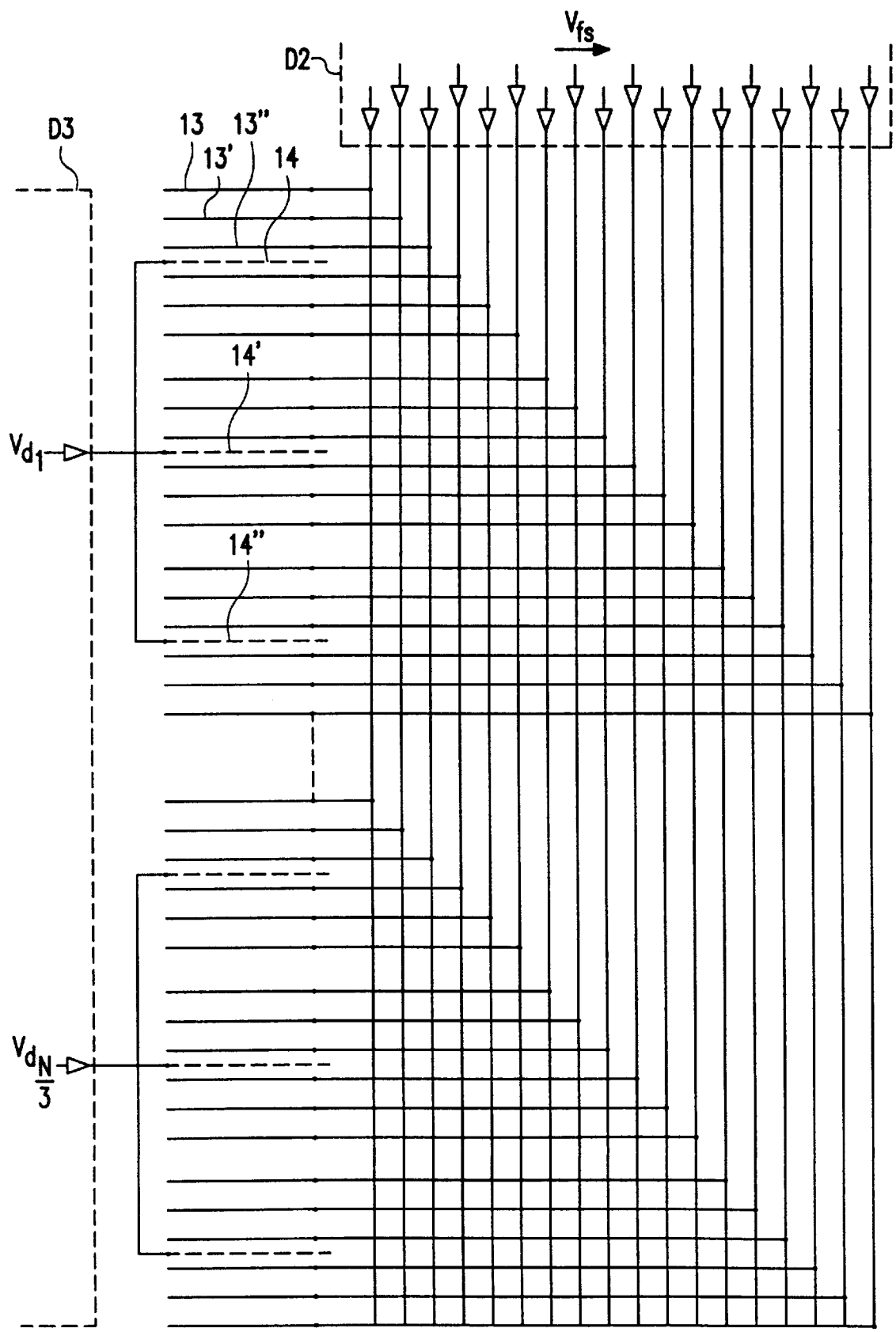
FIG. 7 shows another embodiment for reducing the number of drives of fine-selection electrodes provided with the auxiliary electrodes.

FIG. 7 shows an embodiment in which the number of drivers is still further reduced. In this embodiment the dummy electrodes are interconnected per three groups of six fine-selection electrodes. Now there are 18 drivers for the fine-selection electrodes, which drivers form part of the fine-selection drive circuit D2. By working with groups of 18 electrodes for the fine-selection, the dummy electrodes may be jointly driven per segment of 18 fine-selection electrodes (three in this example) from the fine-selection drive circuit D2. The number of drivers in this embodiment will be N/3+18 (generally the formula is: N/n+6* n, in which N is the number of preselection electrodes and n is the number of groups together forming a segment, while 6 fine-selection electrodes per preselection electrode have been chosen).

It is possible to further interconnect the dummy electrodes but then this will be at the expense of contrast, as will be described hereinafter.

Figure 8:
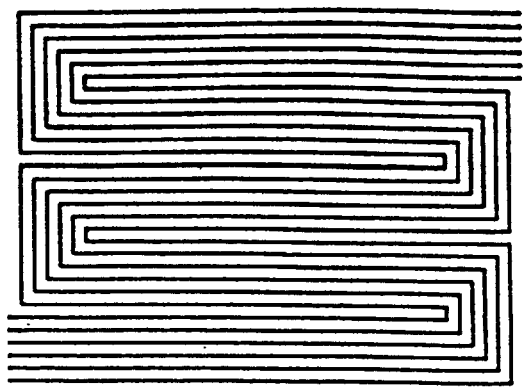
FIGS. 8 to 10 show patterns of series-connected fine-selection electrodes.
Figure 9:
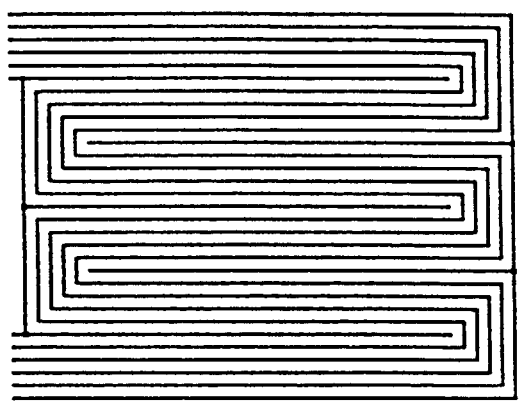
Figure 10:
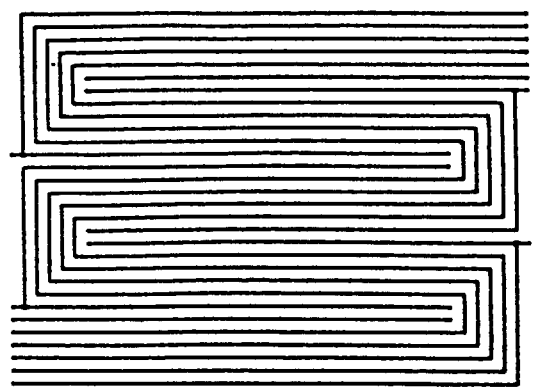

The wiring patterns for the fine-selection electrodes can be interconnected in groups in different manners. For manufacturing purposes, it is advantageous when the patterns and the interconnections can be arranged in one plane without any insulated crossings. A solution is a series arrangement by means of a meander pattern. FIG. 8 shows a pattern of intertwined meanders for six groups of six fine-selection electrodes. This pattern is limited in that two tracks of the same group will be juxtaposed in the "inner bend". In a colour display device these two tracks should not be associated with one and the same coarse selection aperture because the colour selection for this aperture would then be lost. Consequently, given fine-selection patterns cannot be implemented with such a meander pattern. An embodiment which is more suitable in this respect is shown in FIG. 9. In this embodiment two tracks of one and the same group with another track in between are located in the inner bend. This provides a wider possibility of modifications, but it is still a limitation. FIG. 10 shows a meander pattern in which the tracks of one and the same group are separated by at least two other tracks. This is usable for a large number of modifications of fine-selection patterns, but it has the drawback that the number of connections increases because the two "separating tracks" can no longer be interconnected in one and the same plane. The tracks in all meander patterns should have a very good conductance because the track length is very large.

Figure 11:
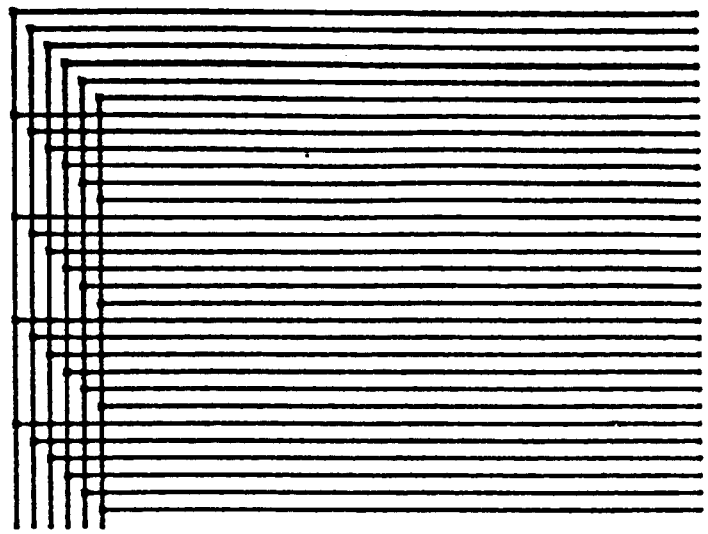
FIGS. 11, 12, 13 and 14 show patterns of parallel-connected fine-selection electrodes.
Figure 12:
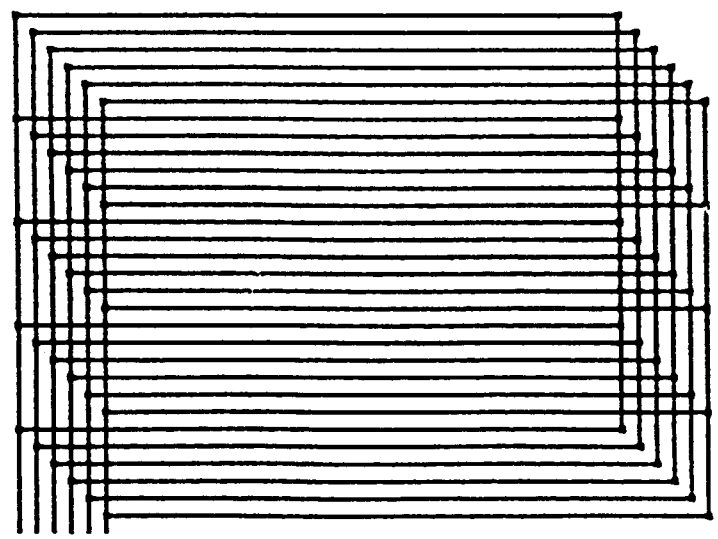

FIG. 11 shows a parallel arrangement of corresponding fine-selection electrodes, in which horizontal and vertical tracks intersect each other in an insulated manner. The crossings at which the tracks are to contact each other are denoted by means of a "fat dot". This can be realised by positioning the vertical tracks at the other side of the (insulating) fine-selection plate with the interconnected crossings being provided with through-connections, or by positioning all tracks at one side of the plate and providing the non-interconnected crossings with an insulating intermediate layer, or by realising the through-connections in an additional, separately provided connection strip. Although such a pattern is more difficult to realise than a meander pattern, this is offset by other advantages:

1. There is hardly any limitation of the possible fine-selection track patterns.
2. The connections are considerably shorter (parallel instead of series arrangement), i.e. the tracks need not have such a good conductance as is required for a meander.
3. FIG. 12 shows how a simple extension may lead to a very great robustness against track interruptions as may occur in the manufacturing process. In this example, in which the six selection electrodes of five groups each are connected at both ends in parallel with the corresponding selection electrodes of the other groups, several track interruptions may occur without this having any consequences for the satisfactory operation of the display.

The maximum interconnection of fine-selection and dummy electrodes has been described with reference to FIGS. 3 to 7. In the numbers mentioned in these descriptions, an optimum contrast was assumed. In the selection patterns shown, very subtle track patterns are used for the dummy electrodes. If the requirement of optimal contrast is, however, alleviated, the dummy electrode pattern may be simpler. This implies that the dummy electrodes can be arranged in broad tracks, each track corresponding to a horizontal strip of fine-selection electrodes. In FIGS. 8 to 12 the fine-selection tracks horizontally cross over from left to right, each time juxtaposed in one track. A dummy track then corresponds to such a horizontal strip of fine-selection patterns. Even in those arrangements of fine (and coarse) selection patterns in which an active fine-selection track does not only select apertures associated with the addressed coarse selection apertures, but also those associated with unaddressed, adjacent coarse selection apertures, it is found that the contrast due to the use of dummy tracks is reduced to a very small extent, which results in a very small "crosstalk" of light to adjacent dots (corresponding to the active fine-selection track).

The invention thus provides, inter alia arrangements for coupling selection electrodes in which the technology of providing these electrodes is as simple as possible and/or the possible fine-selection electrode patterns are such that the number of required selection drivers can be reduced considerably.

Figure 13:
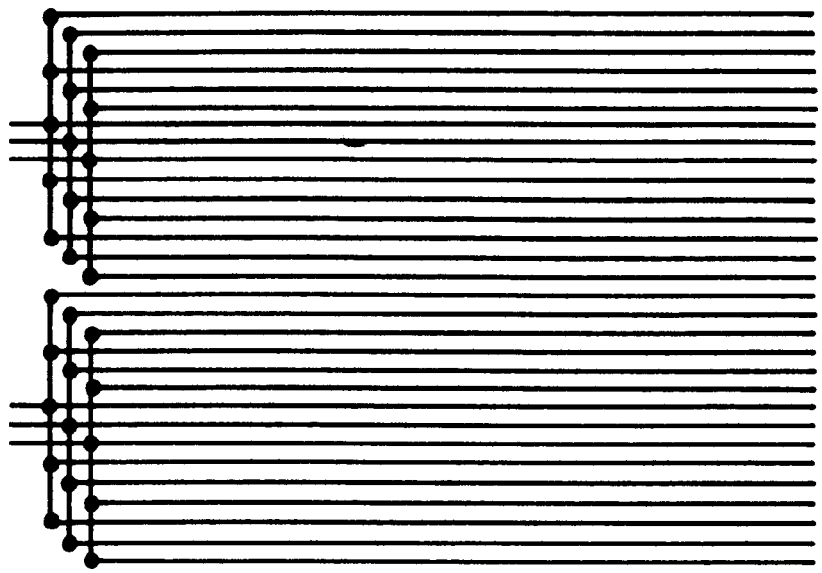
Figure 14:
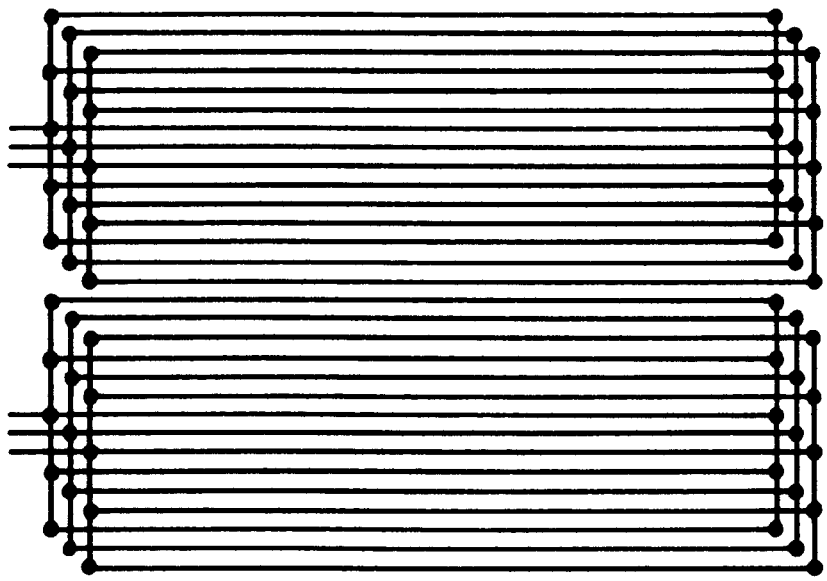

A modification of FIGS. 11 and 12 is shown in FIGS. 13 and 14. The number of electrodes coupled to a single connection is unchanged, but by choosing different through-connections, the number of through-connection tracks is smaller at the edge so that less space is lost at the edge of the construction. Moreover, the construction now provides a simpler possibility of implementing the connections of the dummy electrodes between the fine-selection connections, which saves space. The reasons and advantages as compared with the patterns shown in FIGS. 11 and 12 are maintained. A practical 17" display has 384 fine-selection electrodes which are 8 times interconnected, i.e. there are 384/8=48 connections. These 48 connections are arranged in 3 subjacent blocks of 16 connections each, i.e. 3 blocks of 16 groups in which the electrodes of 8 sections corresponding to each group are interconnected. Thus, along the edge there are each time 16 vertical through-connection tracks. (FIGS. 13 and 14 may be described as 2 blocks of 3 groups in 5 sections; each time 3 through-connection tracks next to each other.)

The drive signals will have an adapted sequence. This means that FIG. 4B will have an extra level of structure on the time scale of blocks. The dummy electrodes will become more complicated in the optimum contrast case: each section has its own dummy electrode. FIGS. 11 and 12 have 5 dummy electrodes. FIGS. 13 and 14 have 10 dummy electrodes, but since the two blocks have entirely separated selection signals, the dummy electrodes can be interconnected to 5 connections again.

It will be evident that modifications of the above-mentioned division into groups, sections and blocks as described with reference to a 17" display are possible without departing from the scope of the invention.

We claim:

1. A picture display device having a flat vacuum envelope which is provided with a transparent face plate with a luminescent screen and with a rear wall, said display device comprising an electron supply section for emitting electron currents, and an active selection electrode section having first, preselection, electrodes and second, fine-selection, electrodes, located closer to the screen, for directing a plurality of electron currents towards desired positions on the luminescent screen, characterized in that:
   a. the fine-selection electrodes comprise n groups of m electrodes each, and in that corresponding electrodes of at least 2 groups are coupled to each other for supplying a selection voltage; and
   b. the preselection electrodes define extraction locations which communicate row by row with electron propagation ducts;
   said fine-selection electrodes being arranged on a fine-selection plate provided with fine-selection apertures, each aperture being associated with a pixel on the luminescent screen and each extraction location being associated with at least two fine-selection apertures.

2. A picture display device as claimed in claim 1, characterized in that corresponding fine-selection electrodes are coupled to each other in that they form part of an electrode track which extends along a meandering path.

3. A picture display device as claimed in claim 1, characterized in that of at least each of two groups at least one fine-selection electrode is coupled in a parallel arrangement to the corresponding electrode of the other group.

4. A picture display device having a flat vacuum envelope which is provided with a transparent face plate with a luminescent screen and with a rear wall, said display device comprising an electron supply section having an electron source for emitting electron currents in a direction parallel to the face plate, and an active selection electrode section having first, preselection, electrodes and second, fine-selection, electrodes, located closer to the screen, for directing a plurality of electron currents towards desired positions on the luminescent screen, characterized in that the fine-selection electrodes comprise n groups of m electrodes each with a first and a second end, in that both the first ends of corresponding electrodes of at least two groups and the second ends of corresponding electrodes of at least two groups are connected in a parallel arrangement.

5. A picture display device as claimed in claim 1 or 4, characterized in that auxiliary (or dummy) electrodes for capturing unwanted electrons are arranged along the electron paths between the preselection and fine-selection electrodes.

6. A picture display device as claimed in claim 5, characterized in that the auxiliary electrodes are coupled to a dummy drive circuit which, under the control of a selection driver, provides the auxiliary electrodes in operation with such a voltage that unwanted electrons are captured.

7. A picture display device as claimed in claim 5, characterized in that each group of fine-selection electrodes is provided with an auxiliary electrode which, in operation, is provided with a fixed voltage by means of the dummy drive circuit.

8. A picture display device as claimed in claim 1 or 4, characterized in that the number of drive voltages to be supplied by a fine-selection drive circuit corresponds to the number of fine-selection electrodes in a group, each first fine-selection electrode of a group being coupled to each first fine-selection electrode of the other groups and each subsequent fine-selection electrode being coupled to each corresponding subsequent fine-selection electrode of the other groups.

9. A picture display device as claimed in claim 1, characterized in that of at least each of two groups at least one fine-selection electrode is coupled in a series arrangement to the corresponding electrode of the other group.

10. A picture display device having a flat vacuum envelope which is provided with a transparent face plate with a luminescent screen and with a rear wall, said display device comprising an electron supply section having an electron source for emitting electron currents in a direction parallel to the face plate, and an active selection electrode section having first preselection electrodes and second fine-selection electrodes, located closer to the screen, for directing a plurality of electron currents towards desired positions on the luminescent screen, characterized in that auxiliary electrodes for capturing unwanted electrons are arranged along the electron paths between the preselection and fine-selection electrodes and in that these auxiliary electrodes are arranged in the form of tracks each having a width corresponding to the width of an associated group of fine-selection electrodes.

11. A display device comprising an evacuable envelope and including a face plate bearing a luminescent screen having a multiplicity of predefined areas and means for selectively energizing respective ones of said areas to produce an image, said means comprising:

a. at least one electron source;

b. a plurality of adjacent, longitudinally extending transport ducts, each having at least one wall means comprising a material having a predetermined secondary emission coefficient, said ducts each having an input portion in communication with the at least one electron source for receiving electrons and having a plurality of extraction locations for enabling the extraction of electrons from said duct;

c. an arrangement of communication ducts disposed between the transport ducts and the luminescent screen, each communication duct including at least first and second communicating passageways between one of the extraction locations and respective ones of the predefined areas of the screen;

d. preselection electrode means disposed adjacent the extraction locations for selectively effecting extraction of electrons from the transport ducts at selected ones of said locations; and e. a plurality of groups of fine-selection electrodes disposed adjacent the communicating passageways for effecting selective passage of electrons through said passageways, corresponding electrodes of at least two of said groups being electrically connected to each other.

12. A display device as in claim 11 where:

a. the preselection electrode means comprises preselection electrodes arranged in rows extending transversely to the transport ducts, said preselection electrodes being disposed adjacent respective rows of the extraction locations; and b. the fine-selection electrodes are arranged on a plate adjacent respective rows of apertures defining fine-selection apertures.

13. A display device as in claim 11 or 12 where at least some of the fine-selection electrodes are arranged in a meandering pattern.

14. A display device as in claim 11 or 12 where, in at least first and second ones of the groups of fine-selection electrodes, the corresponding electrodes are electrically connected in parallel.

15. A display device as in claim 11 or 12 where each of the fine-selection electrodes has a first end and a second end, said corresponding electrodes of at least two of said groups being electrically connected to each other at both of said first and second ends.

16. A display device as in claim 11 or 12 including auxiliary electrodes disposed in the communication ducts for capturing misdirected electrons.

17. A display device as in claim 16 including drive circuit means for, in operation, applying a voltage to the auxiliary electrodes for attracting said misdirected electrons.

18. A display device as in claim 16 where each of said groups includes one of said auxiliary electrodes.

19. A display device as in claim 18 where the fine-selection electrodes and the auxiliary electrode in each group are arranged in the form of conductive tracks.

20. A display device as in claim 11 or 12 including means for applying different voltages to respective ones of the fine-selection electrodes in one of said groups.

21. A display device as in claim 11 or 12 where, in at least first and second ones of the groups of fine-selection electrodes, the corresponding electrodes are electrically connected in series.

22. A display device as in claim 11 where, at least first and second ones of said groups of fine-selection electrodes are disposed adjacent to each other.

23. A display device as in claim 11 where, at least first and second ones of said groups of fine-selection electrodes are interspersed with each other.

* * * * *